United States Patent Office 3,294,786
Patented Dec. 27, 1966

3,294,786
17-ETHERS OF 2 α-METHYL-ANDROSTANE-17β-OL-3-ONE
Alexander D. Cross and Ian T. Harrison, Mexico City, Mexico, assignors to Syntex Corporation, Panama, Panama, a corporation of Panama
No Drawing. Filed Feb. 24, 1965, Ser. No. 435,075
11 Claims. (Cl. 260—239.55)

The present invention relates to novel cyclopentanophenanthrene derivatives and to a process for the production thereof.

More particularly the present invention relates to novel 17-ethers of 2α-methyl-androstan-17β-ol-3-one and 2α-methyl-19-nor-androstan-17β-ol-3-one.

The novel compounds of the present invention are represented by the following formula:

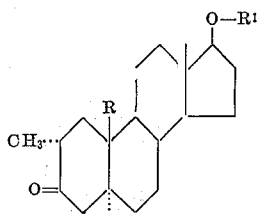

In the above formula R represents hydrogen or methyl and $R^1$ represents:

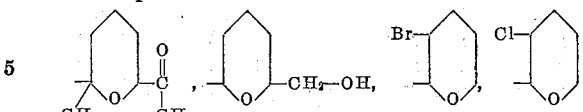

or

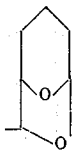

The novel compounds of the present invention represented by the above formula are anabolic-androgenic agents with a favorable anabolic-androgenic ratio. In addition they have anti-estrogenic, anti-gonadothrophic, anti-fibrallatory and appetite stimulating properties. Furthermore, they lower the blood cholesterol level, relieve premenstrual tension and suppress the output of the pituitary gland.

The novel compounds of the present invention are prepared by the process exemplified as follows:

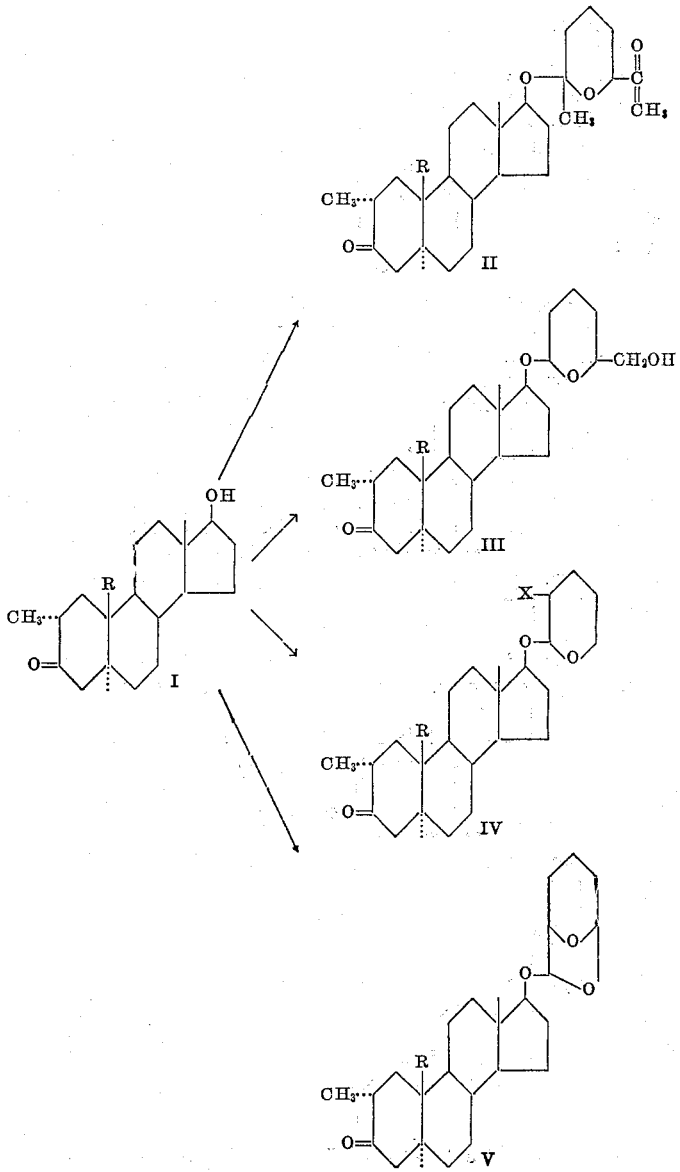

In the above formulae R has the same meaning as set forth hereinbefore; and X represents chlorine or bromine.

In carrying out the process of the present invention the starting compound I which may be either 2α-methyl-androstan-17β-ol-3-one, or 2α-methyl-19-nor-androstan-17β-ol-3-one is treated with 2-methyl-19-nor-androstan-pyrane, preferably in toluene or benzene in the presence of p-toluenesulfonic acid, at room temperature for about 2 hours, to give the corresponding 17β(2'-methyl-6'-acetyl-tetrahydropyran-2'-yl)-oxy derivative (II).

Upon treatment of the starting compound (I) with 6-acetoxymethyl-5,6-dihydropyrane in a suitable solvent such as benzene or toluene, in the presence of p-toluenesulfonic acid at about room temperature for a period of time of the order of 2 hours, there is obtained the corresponding 17α(6'-acetoxymethyl-tetrahydropyran-2'-yl)-oxy derivative, which, upon conventional saponification in a basic medium affords the corresponding 17α(6'-hydroxymethyl-tetrahydropyran-2'-yl)-oxy derivative (III).

When the starting compound (I) is treated with a 2,3-dihalo-tetrahydropyran, for example 2,3-dibromo, or 2,3-dichloro tetrahydropyran, in a suitable solvent such as benzene or toluene, in the presence of a tertiary amine such as pyridine or triethylamine, for a period of time of the order of 24 hours at about room temperature, there is obtained the corresponding 17α(3'-halo-tetrahydropyran-2'-yl)-oxy derivative (IV).

The starting compound (I) is treated with 6-formyl-5,6-dihydropyran, in a suitable solvent such as benzene or toluene, in the presence of p-toluenesulfonic acid for a period of time that may range between 30 minutes and 12 hours, at a temperature comprised between the reflux temperature of the reacting mixture and room temperature to give the corresponding 17α(3',7'-epoxy-perhydro-oxepin-2'-yl)-oxy derivative (V).

The following specific examples serve to illustrate but are not intended to limit the scope of the present invention:

Example I

A mixture of 1 g. of 2α-methyl-androstan-17β-ol-3-one, 1 g. of 2-methyl-6-acetyl-5,6-dihydropyran, 100 mg. of p-toluenesulfonic acid and 100 cc. of benzene was kept at room temperature for 2 hours, then it was successively washed with a dilute solution of sodium bicarbonate and water, dried over anhydrous sodium sulfate and evaporated to dryness. Crystallization of the residue from acetone-hexane yielded 17α(2'-methyl-6'-acetyl-tetradro-pyran-2'-yl)oxy-2α-methyl-androstan-3-one.

2α-methyl-19-nor-androstan-17β-ol-3-one, was treated by the same procedure, thus yielding 17α-(2'-methyl-6'-acetyl-tetrahydropyran-2'-yl)-oxy - 2α - methyl-19-nor-androstan-3-one.

Example II

A mixture of 1 g. of 2α-methyl-androstan-17β-ol-3-one, 1 g. of 6-acetoxy-methyl-5,6-dihydropyran, 10 mg. of p-toluenesulfonic acid and 100 cc. of benzene was kept at room temperature for 2 hours. Then it was successively washed with a dilute aqueous sodium bircarbonate solution and water, dried over anhydrous sodium sulfate and evaporated to dryness. The residue was dissolved in methanol and there was added 1 g. of sodium hydroxide in 20 cc. of ethanol and the resulting mixture was refluxed for 1 hour. Water was added and the product was extracted with methylene chloride. The extract was evaporated to dryness and the residue crystallized from acetone-hexane to give 17α(6'-hydroxymethyl-tetrahydropyran-2'-yl)-oxy-2α-methyl-androstan-3-one.

2α- methyl-19-nor-androstan-17β-ol-3-one was treated according to the procedure just described, thus yielding 17α-(6'-hydroxymethyl-tetrahydropyran-2'-yl) - oxy - 2α-methyl-19-nor-androstan-3-one.

Example III

A mixture of 1 g. of 2α-methyl-androstan-17β-ol-3-one, 2 g. of 2,3-dibromo-tetrahydropyran, 1 cc. of pyridine and 100 cc. of benzene, was kept at room temperature for 24 hours. The resulting solution was washed successively with a 1% aqueous hydrochloric acid solution and water, dried over anhydrous sodium sulfate and evaporated to dryness. Crystallization of the residue from acetone-hexane afforded 17α-(3'-bromo-tetrahydropyran-2-yl)-oxy-2α-methyl androstan-3-one.

2α-methyl-19-nor-androstan-17β-ol-3-one was treated following exactly the above procedure, thus yielding 17α-(3'-bromo - tetrahydropyran - 2' - yl) - oxy-2α-methyl-19-nor-androstan-3-one.

2α-methyl-androstan-17β-ol-3-one and 2α-methyl-19-nor-androstan-17β-ol-3-one were treated according to the above procedure, except that there was used 2,3-dichloro tetrahydropyran instead of 2-3-dibromo tetrahydropyran, thus affording respectively 17α-(3'-chlorotetrahydropyran-2'-yl)-oxy-2α-methyl-androstan-3 - one and 17α-(3'-chlorotetrahydropyran - 2' - yl)-oxy-2α-methyl-19-nor-androstan-3-one.

Example IV

A mixture of 1 g. of 2α-methyl-androstan-17β-ol-3-one, 1 g. of 6-formyl-5,6-dihydropyran, 100 mg. of p-toluenesulfonic acid and 100 cc. of benzene was refluxed for 30 minutes. Then it was cooled, washed successively with a dilute aqueous sodium bicarbonate solution and water, dried over anhydrous sodium sulfate and evaporated to dryness. The residue crystallized from acetone-hexane to give 17α-(3',7'-epoxy - perhydro - oxepin-2'-yl)-oxy-2α-methyl-androstan-3-one.

2α-methyl-19-nor-androstan-17β-ol-3-one was treated by the same procedure to five 17α-(3',7'-epoxy-perhydro-oxepin-2'-yl)-oxy-2α-methyl-19-nor-androstan-3-one.

We claim:
1. A compound of the following formula:

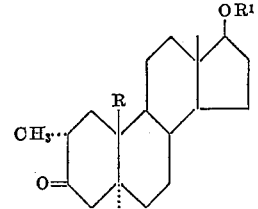

wherein R is selected from the group consisting of hydrogen and methyl and R¹ is a member of the group consisting of

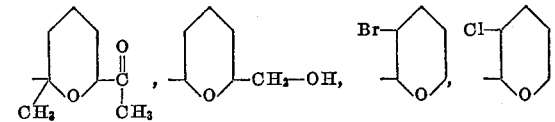

and

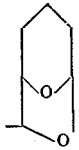

2. 17α - (2' - methyl-6'-acetyl - tetrahydropyran-2'-yl)-oxy-2α-methyl-androstan-3-one.

3. 17α-(2' - methyl-6'-acetyl - terahydropyran-2'-yl)-oxy-2α-methyl-19-nor-androstan-2-one.

4. 17α - (16' - hydroxymethyl - tetrahydropyran-2'-yl)-oxy-2α-methyl-androstan-3-one.

5. 17α - (6' - hydroxymethyl - tetrahydropyran - 2'-yl)-oxy-2α-methyl-19-nor-androstan-3-one.

6. 17α - (3' - bromo - tetrahydropyran-2'-yl) - oxy-2α-methyl-androstan-3-one.

7. 17α - methyl-(3'bromo-tetrahydropyran-2'-yl)-oxy-2α-methyl-19-nor-androstan-3-one.

8. 17α - (3'-chloro - tetrahydropyran - 2'-yl) - oxy - 2α-methyl-androstan-3-one.

9. 17α - (3'-chloro-tetrahydropyran - 2' - yl) - oxy-2α-methyl-19-nor-androstan-3-one.

10. 17α-(3',7' - epoxy - perhydro-oxepin-2'-yl)-oxy-2α-methyl-androstan-3-one.

11. 17α - (3',7' - epoxy-perhydro-oxepin-2'-yl)-oxy-2α-methyl-19-nor-androstan-3-one.

References Cited by the Examiner
UNITED STATES PATENTS 3,158,607  11/1964  Cross _____ 260—239.55

LEWIS GOTTS, *Primary Examiner.*
HENRY A. FRENCH, *Assistant Examiner.*